United States Patent
Zhang et al.

(10) Patent No.: US 10,205,792 B2
(45) Date of Patent: Feb. 12, 2019

(54) METHOD AND APPARATUS FOR PROCESSING PAGE OPERATION DATA

(71) Applicant: TENCENT TECHNOLOGY (SHENZHEN) COMPANY LIMITED, Shenzhen, Guangdong (CN)

(72) Inventors: Yangchao Zhang, Shenzhen (CN); Bin Li, Shenzhen (CN); Yongzhi Guo, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 361 days.

(21) Appl. No.: 15/156,441

(22) Filed: May 17, 2016

(65) Prior Publication Data

US 2016/0261702 A1    Sep. 8, 2016

Related U.S. Application Data

(63) Continuation of application No. PCT/CN2014/091397, filed on Nov. 18, 2014.

(30) Foreign Application Priority Data

Nov. 20, 2013 (CN) .......................... 2013 1 0589063

(51) Int. Cl.
   H04L 29/08     (2006.01)
   H04L 12/24     (2006.01)
   G06Q 10/10     (2012.01)

(52) U.S. Cl.
   CPC ............. H04L 67/22 (2013.01); G06Q 10/10 (2013.01); H04L 41/142 (2013.01)

(58) Field of Classification Search
   CPC ........ H04L 41/142; H04L 67/22; G06Q 10/10
   See application file for complete search history.

(56) References Cited

U.S. PATENT DOCUMENTS

| | | | |
|---|---|---|---|
| 7,680,746 B2 | 3/2010 | Agarwal | |
| 2003/0115333 A1* | 6/2003 | Cohen | G06F 17/3089 709/227 |

(Continued)

FOREIGN PATENT DOCUMENTS

| | | |
|---|---|---|
| CN | 101989303 A | 3/2011 |
| CN | 102184175 A | 9/2011 |

(Continued)

OTHER PUBLICATIONS

Chinese Office Action for Application No. 2013105890630 dated Dec. 25, 2017, and an English concise explanation of relevance thereof.

(Continued)

Primary Examiner — Abdulkader M Alriyashi
(74) Attorney, Agent, or Firm — Harness, Dickey & Pierce, P.L.C.

(57) ABSTRACT

A server receives, from a user terminal, the page operation data produced when a user performs operations on each page of a designated program, a user's identifier, and a page identifier operated by the user. The server conducts statistics for the page operation data and obtains a total number of the user operations on the page during a preset statistical period according to the identifier of the user and the identifier of the page that the user operated. The server generates a statistics tree corresponding to a sequential relationship among the pages according to the sequential relationship among the pages, the total number of user operations on each of the pages within the preset statistical period, and the page operation data.

12 Claims, 5 Drawing Sheets

(56) References Cited

U.S. PATENT DOCUMENTS

| | | | | |
|---|---|---|---|---|
| 2003/0130982 A1* | 7/2003 | Kasriel | ............... | G06F 17/3089 |
| 2006/0075068 A1* | 4/2006 | Kasriel | ............ | G06F 17/30902 |
| | | | | 709/217 |
| 2006/0235962 A1* | 10/2006 | Vinberg | .............. | H04L 41/0631 |
| | | | | 709/224 |
| 2013/0263280 A1* | 10/2013 | Cote | ....................... | G06F 21/62 |
| | | | | 726/26 |

FOREIGN PATENT DOCUMENTS

| | | |
|---|---|---|
| CN | 102231165 A | 11/2011 |
| CN | 102479192 A | 5/2012 |
| CN | 102591990 A | 7/2012 |
| CN | 102999634 A | 3/2013 |
| CN | 103186604 A | 7/2013 |
| CN | 103246526 A | 8/2013 |

OTHER PUBLICATIONS

International Search Report for International Application No. PCT/CN2014/091397 dated Feb. 17, 2015.

Zhang, Xiao-feng, "Facing the Web Site of Data Mining Technology in the Optimization of Personalized Recommendation Methods of Research and Application", dated Jan. 2012, and an English abstract thereof.

International Preliminary Report on Patentability for International Application No. PCT/CN2014/091397, dated Jun. 2, 2016.

* cited by examiner

METHOD AND APPARATUS FOR PROCESSING PAGE OPERATION DATA

CROSS-REFERENCE TO RELATED APPLICATIONS

This application is a continuation of International Application No. PCT/CN2014/091397, filed Nov. 18, 2014. This application claims the benefit and priority of Chinese Application No. 201310589063.0, filed Nov. 20, 2013. The entire disclosures of each of the above applications are incorporated herein by reference.

FIELD

The present disclosure relates to computer technical fields and to a method and apparatus for processing page operation data.

BACKGROUND

This section provides background information related to the present disclosure which is not necessarily prior art.

Software development is a kind of system engineering which includes requirements capture, requirements analysis, design, implementation, and testing. After software is released, the software needs to be optimized according to the use of a large number of users.

SUMMARY

This section provides a general summary of the disclosure, and is not a comprehensive disclosure of its full scope or all of its features.

In view of the above, the present disclosure provides a method and apparatus for processing page operation data, in order to improve speed and efficiency of software optimization.

A method for processing page operation data includes receiving, by a server, from a user terminal, the page operation data produced when a user performs operations on each of pages of a designated program, a user's identifier of the user and a page identifier of the page operated by the user, conducting, by the server, statistics for the page operation data and obtaining a total number of the user operations on the page during a preset statistical period according to the identifier of the user and the identifier of the page that the user operated; generating, by the server, a statistics tree corresponding to a sequential relationship among the pages according to the sequential relationship among the pages, the total number of user operations on each of the pages within the preset statistical period, and the page operation data, wherein the statistics tree comprises nodes corresponding to each of the pages and node statistics corresponding to each of the nodes.

A apparatus for processing page operation data includes a receiving module, to receive from a user terminal, the page operation data produced when a user performs operations on each of pages of a designated program, a user's identifier of the user and a page identifier of the page operated by the user, a statistic module, to conduct statistics for the page operation data, obtain a total number of the user operations on the page during a preset statistical period according to the identifier of the user and the identifier of the page that the user operated, a statistics tree generating module, to generate a statistics tree corresponding to a sequential relationship among the pages according to the sequential relationship among the pages, the total number of user operations on each of the pages within the preset statistical period, and the page operation data, wherein the statistics tree comprises nodes corresponding to each of the pages and node statistics corresponding to each of the nodes.

It can been seen from above that a server receives, from a user terminal, the page operation data produced when a user performs operations on each of pages of a designated program, a user's identifier of the user and a page identifier of the page operated by the user, conducts statistics for the page operation data and obtains a total number of the user operations on the page during a preset statistical period according to the identifier of the user and the identifier of the page that the user operated, generates a statistics tree corresponding to a sequential relationship among the pages according to the sequential relationship among the pages, the total number of user operations on each of the pages within the preset statistical period, and the page operation data, wherein the statistics tree comprises nodes corresponding to each of the pages and node statistics corresponding to each of the nodes. Since user operation characteristic parameters voluntarily sent by the user terminal are received timely and statistics are conducted for these parameters, the statistical result can be considered as an effective base for software optimization, and the issues in the software that appear when the user operates the software can be optimized rapidly and the software usability can be improved. Further, according to operation flows and operation habits of each user during a process of using the software, strengths and weaknesses for operations and functions of the designated program can be effectively known immediately, thereby implementing targeted software optimizations, and improving speed and effectiveness of the software optimizations.

To make the above more clear, hereinafter examples will be provided and described in detail in conjunction with the accompanying drawings.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

To further illustrate the technical approaches and effects presented in the present disclosure to achieve the intended purpose of the present disclosure, hereinafter, implementations, structures, characteristics, and effects of the present disclosure will be described in detail in conjunction with the various embodiments of the present disclosure.

After the development of software is completed and the software is released, user's operations can be tracked and a statistic of the user's operations can be made according to feedback of the users. However, this makes the interaction between software inefficient and does not improve the software quality in accordance with needs of users.

A method for processing page operation data is provided according to various embodiments of the present disclosure, which can be used to process the page operation data.

Figure 1:
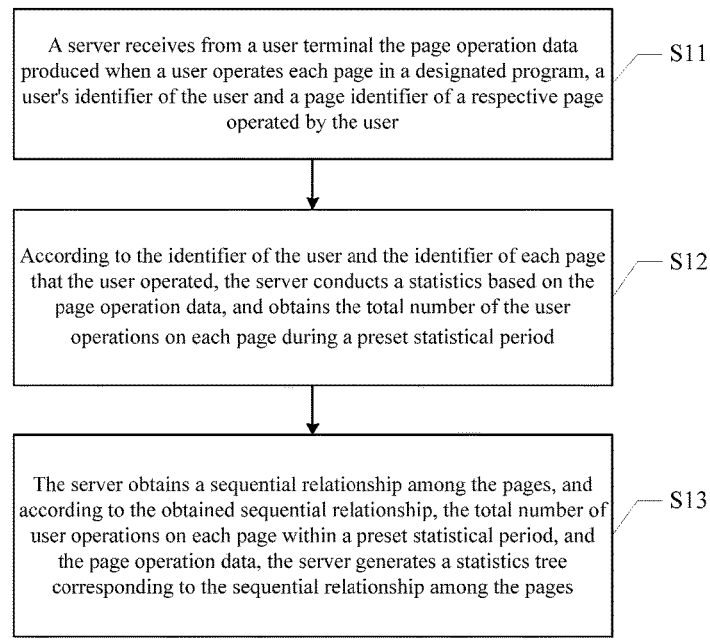
FIG. 1 is a flowchart illustrating a method for processing page operation data according to various embodiments.

FIG. 1 shows a flow chart of a method for processing page operation data according to various embodiments of the present disclosure. As shown in FIG. 1, the method for processing page operation data according to this example may include the following procedures.

Block S11: A server receives, from a user terminal, the page operation data produced when a user operates each page in a designated program, a user's identifier of the user, and a page identifier of a respective page operated by the user. User terminals may include smart phones, tablets, e-book readers, MP3 players (Moving Picture Experts Group Audio Layer III, motion picture compression standard audio expert level 3), MP4 players (Moving Picture Experts Group Audio Layer IV, motion pictures experts audio compression standard level 4), portable laptop computers, desktop computers, onboard computers, and so on. The designated program may be an application program installed in the user terminal, and may include one or more pages. The user can access the services provided by the designated program by interaction with the one or more pages in the designated program. For example: when the user uses an electronic phone book, by an interaction with multiple pages of the electronic phone book, the user can access preset telephone numbers of the users, store anther user's phone number, and edit and send text messages, in addition to other services.

Operation data (T) generated when a user operates pages in the designated program may include at least a time (T1) when the user enters each page, a time (T2) when the user departs each page, and a time period (T0, T0=T1−T2) when the user stays on each page. According to various embodiments, T1 and T2 may be obtained by the user terminal by extracting corresponding functions of each page of the designated program. According to various embodiments, T1 and T2 may be obtained by the user terminal by analyzing a user's operation log. According to a preset report strategy, the user terminal obtains the user's identifier (U), a page identifier (P) of each page, which is operated by the user in a designated program, and page operation count (T) produced when the user operates each page, then reports the obtained U, P, T to the server. A server receives the U, P, T reported by the user terminal and stores them in a database.

Block S12: According to the identifier of the user and the identifier of each page that the user operated, the server conducts statistics based on the page operation data, and obtains the total number of the user operations on each page during a preset statistical period. In one interaction with the multiple pages in a designated program, the server will produce a click sequence in which page jump buttons (for example, move to a previous page, move to the next page, return to the main menu, quit a designated program) are ordered by times, i.e., a click sequence for users in a process of using a designated program, and this click sequence may be called a click stream. The server, based on a regular basis (for example, 24 hours), classifies and gathers the user's identifier (U) transmitted from the user terminal, the page identifier (P) of each page which is operated by the user in the designated program, and the page operation count (T) produced when the user operates, and collect statistics of the user's click streams based on the U, P, T to obtain the total number of operations of at least one user within a preset statistical period (for example, within 24 hours) on each page in the designated program. It should be understood that, due to the characteristics of the click stream, the multiple clicks on the same page by the users with the same user identifier will be counted as the clicks of the users with different user identifiers, that is, the clicks will be counted multiple times.

Block S13: The server obtains a sequential relationship among the pages and, according to the obtained sequential relationship, the total number of user operations on each page within a preset statistical period and the page operation data, the server generates a statistics tree corresponding to the sequential relationship among the pages. According to various embodiments of the present disclosure, the server obtains the sequential relationship among the pages and, according to the sequence relationship obtained, the total number of the user operations on each page during a preset statistical period as well as the time when the user enters the page and the time when the user departs the page (these two times are included in the page operation data), the server generates the statistics tree corresponding to the sequential relationship among the pages.

According to various embodiments, the statistics tree includes nodes corresponding to each page and node statistics corresponding to a respective node. Since the designated program has a plurality of functions, in order to implement the plurality of the functions of the designated program, several sequential relationships among the multiple pages are preset in the designated program. For example, assume that page A can jump to page B1 and can also jump to B2. A function implemented when page A jumps to page B1 may include showing a user contact list, a function implemented when page A jumps to page B2 may include showing a text message list to the user, and so on.

The server acquires the sequential relationship among the pages in the designated program and then builds a tree-based statistical model for the user's click stream according to the sequential relationship obtained. The tree-based statistical model includes a plurality of nodes, and each of the plurality of nodes corresponds to a respective page of the designated program. The server calculates an operation probability value of each page according to the total number of user operations and the number of users in each page of the designated program within a preset statistical period (such as 24 hours), writes the operation probability value into a respective node of the tree-based statistical model, and generates a statistics tree. Here, the node statistics includes at least the operation probability value of the page. The operation probability value for each child node in the statistics tree equals to the operation probability value that the user operates each page corresponding to the child node on the premise that the user operates a page corresponding to a parent node of the child node.

Figure 2:
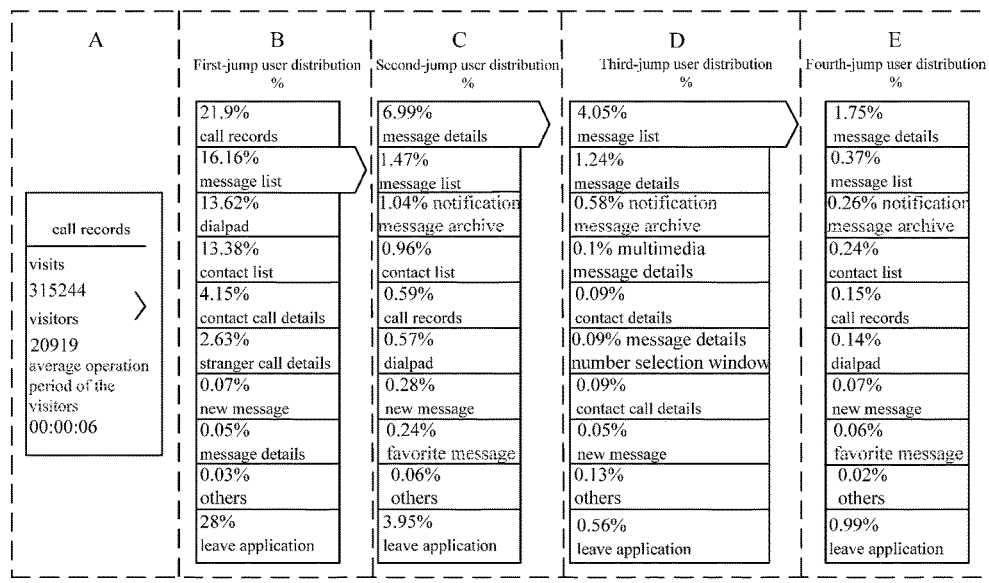
FIG. 2 is a diagram illustrating a statistics tree of a method for processing page operation data according to various embodiments.

FIG. 2 is a diagram of a statistics tree. From left to right, the statistics tree includes five layers labeled A, B, C, D and E, wherein layer A is a root layer of the statistics tree, which can be understood as an initial interface after the designated program starts, layer B includes first-level child nodes of the statistics tree, layer C includes second-level child nodes of the statistics tree (FIG. 2 illustrates next-level child nodes which have sequential relationship with a "Message List" child node in layer B), layer D includes third-level child nodes of the statistics tree (FIG. 2 illustrates next-level child nodes which have sequential relationship with a "Message details" child node in layer C), and layer E includes fourth-level child nodes of the statistics tree (FIG. 2 illustrates next-level child nodes which have sequential relationship with the "Message list" child node in layer D). Each child node in each layer stores an operation probability value of the page corresponding to this child node, i.e., the operation probability value that the user operates a page corresponding to the child node on the premise that the user operates the page corresponding to the parent node of the child node. For example, "notification message archive" child node in layer D has an operation probability value of 0.58%. That is, after the user operates the "message details" page corresponding to the "message details" child node (which is the parent node of the "notification message archive" child node) in layer C, the probability that the user selects to operate the "notification message archive" page corresponding to the "notification message archive" child node equals to 0.58%. In other words, if 6.99% of 100 users operate the "message details" page in layer C, the value 0.58% is the probability that the 6.99% of 100 users selects to operate the "notification message archive" page. The statistics tree can help program designers to easily determine a user's operation process flow and a usage routine when a designated program is used, thereby helping the program designer realize the strengths and weaknesses of the operations and functions of the designated program, subsequently performing targeted optimizations to the designated program.

According to various embodiments, the server calculates an average operation period of the user on each page within a preset statistical period based on the time when the user enters the page and the time when the user departs the page, and generates a statistics tree. Here, the node statistics comprise at least the average operation period of the user on each page within a preset statistical period.

According to the method for processing page operation data according to various embodiments, the server receives, from a user terminal the operation data generated when a user operates each page in the designated program, the identifier of the user and the page identifier of each page that is operated by the user in the designated program, conducts a statistic for the page operation data based on the identifier of the user and the page identifier of each page that is operated by the user, obtains the total number of the operations of the user on each page in a present statistical period, obtains a sequential relationship among the pages, and generates a statistics tree corresponding to the sequential relationship among the pages, wherein the statistics tree includes each node corresponding to each page and the operation probability value corresponding to each node. Since the user operation characteristic parameters voluntarily sent by the user terminal are received quickly and a statistic is conducted for these parameters, a statistical result can be considered as an effective base for optimizing the software, and the issues in the software that appear when the user operates the software can be optimized rapidly and the software usability can be improved. Further, according to operation flows and operation habits of each user during a process of using the software, strengths and weaknesses of the operations and functions of the designated program can be effectively known immediately, thereby implementing targeted software optimizations, and improving speed and effectiveness of the software optimizations.

Figure 3:
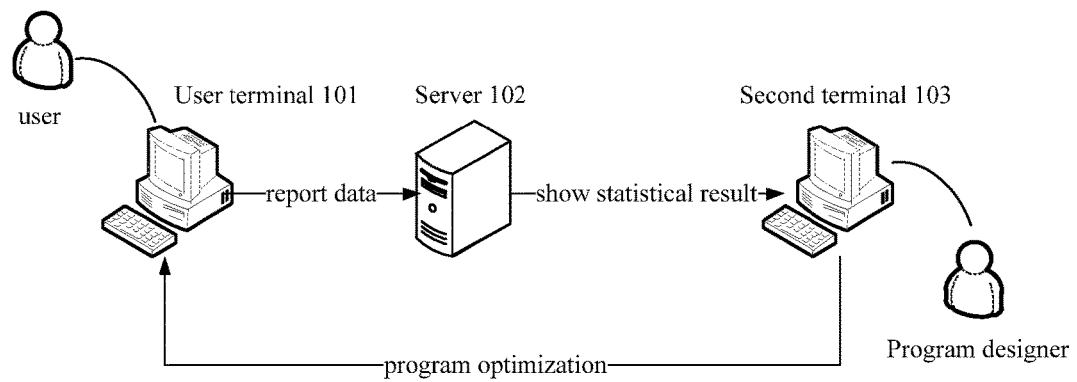
FIG. 3 is a diagram illustrating an application environment of a method for processing page operation data according to various embodiments.

FIG. 3 shows an application environment of a method for processing page operation data according to various embodiments of the present disclosure. As shown in FIG. 3, a user terminal 101 is used as a first terminal and a server 102 and a second terminal 103 are in a wireless or wired network. Via the wireless or wired network, the user terminal 101 reports the obtained user's operation data to the server 102, the server 102 conducts a statistics for the operation data reported by the user terminal 101 and sends a statistical result to the second terminal 103, and the second terminal 103 then displays the statistical result to program designers so that the program designers can make an optimization for the designated program preset in the user terminal 101.

Figure 4:
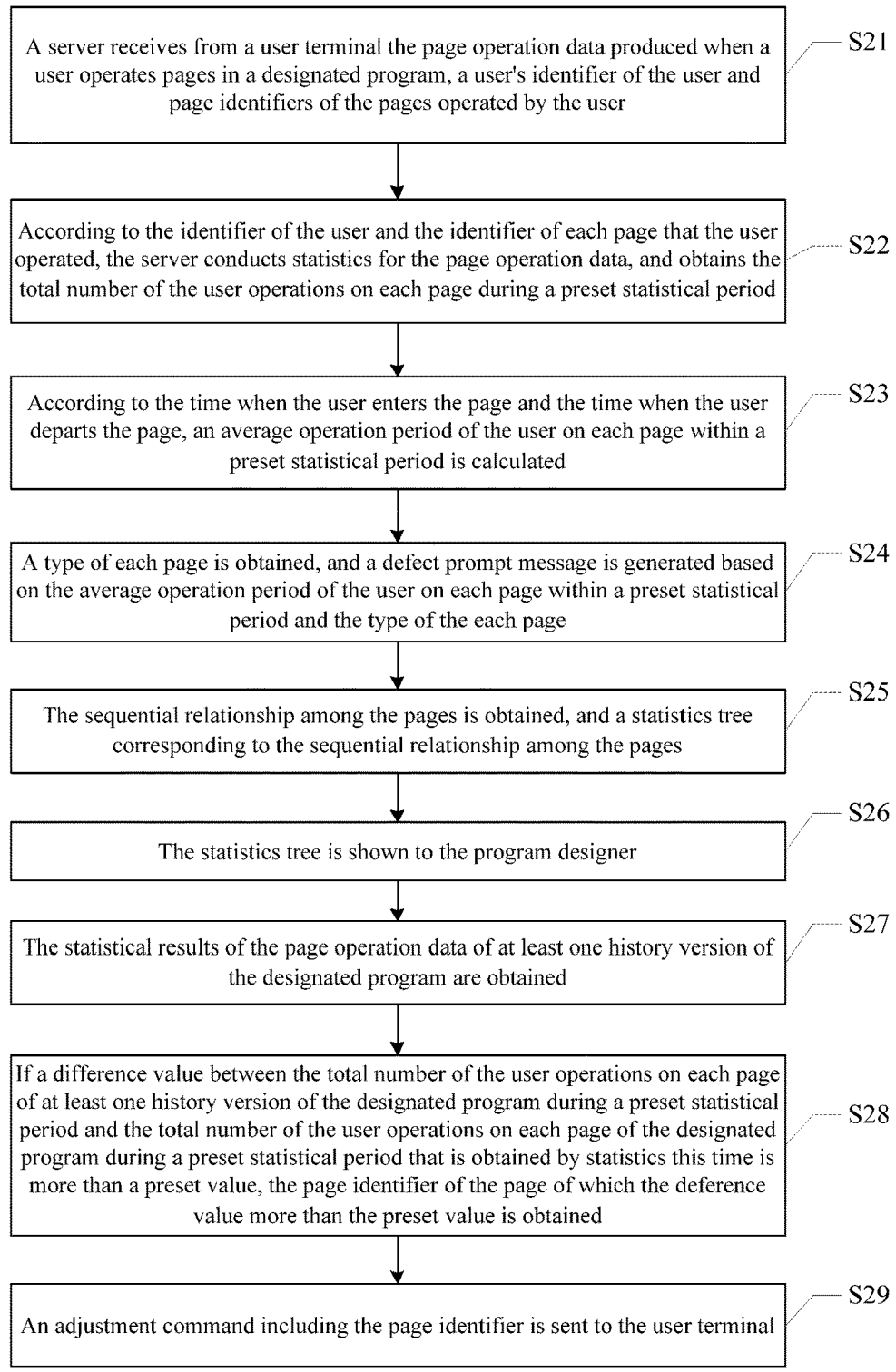
FIG. 4 is a flowchart illustrating a method for processing page operation data according to various embodiments.

FIG. 4 shows a flow chart of a method for processing page operation data according to various embodiments of the present disclosure. As shown in FIG. 4, the method for processing page operation data according to this example may include the following procedures.

Block S21: A server receives, from a user terminal, the page operation data produced when a user operates pages in a designated program, a user's identifier of the user, and page identifiers of the pages operated by the user.

According to various embodiments, page operation data (T) may include at least one of the following. A time (T1) when the user enters each page, a time (T2) when the user departs each page, and a time period (T0, T0=T1−T2) when the user stays on each page, and a page jump mode (M) of each page. A page jump mode is defined as the page switching method when a page jumps to the next page, such as a push animation (Push) Jump mode, a pop-up animation (Present) jump mode, and the like. According to a preset report strategy, the user terminal 101 acquires the user's identifier (U), the page identifier (P) of a page, which is operated by the user in a designated program, a page operation count (T) produced when the user operates each page, and the page jump mode (M) of each page, and then reports the obtained U, P, T, and M to the server 102. The detailed method for obtaining U, P, T, and M may be apparent by reference to the contents in the first example provided herein and, thus, the detailed contents will not be described moreover.

Block S22: According to the identifier of the user and the identifier of each page that the user operated, the server conducts statistics for the page operation data and obtains the total number of the user operations on each page during a preset statistical period. The detailed method in this block may be apparent by reference to the contents in the first example provided herein and, thus, the detailed contents will not be described moreover.

Block S23: According to the time when the user enters the page and the time when the user departs the page, an average operation period of the user on each page within a preset statistical period is calculated. The average operation period of the user on each page within a preset statistical period may be defined as the value obtained by performing a reminder operation on the total duration that all the users who operated the page and the number of the users above.

Block S24: A type of each page is obtained and a defect prompt message is generated based on the average operation period of the user on each page within a preset statistical period and the type of the each page.

Figure 5:
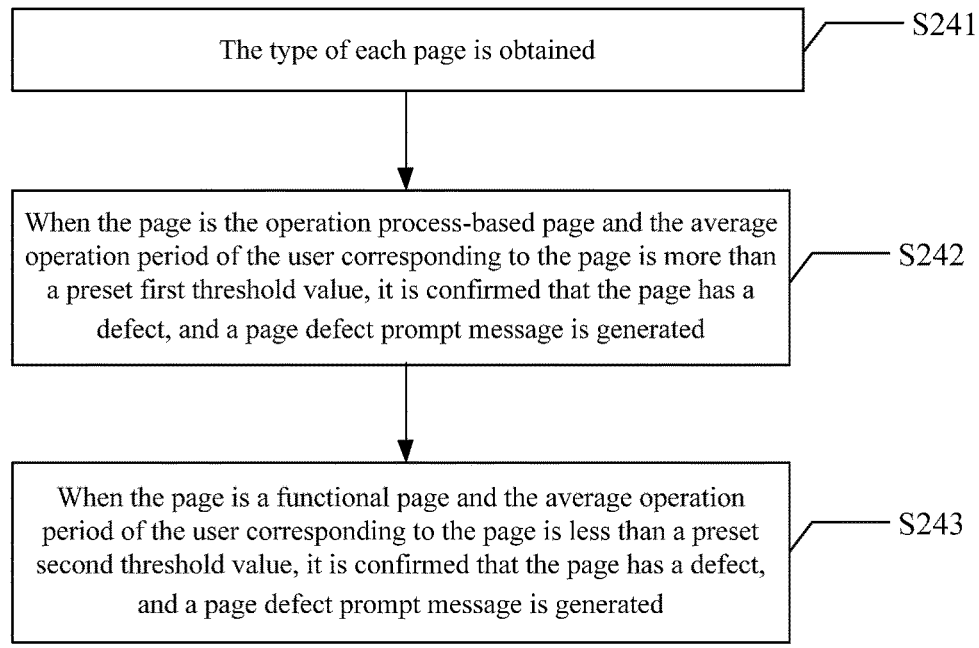
FIG. 5 is a flowchart illustrating a process at block S24 in FIG. 4 according to various embodiments.

As shown in FIG. 5, the procedures as follow may be included in the block.

Block S241: The type of each page is obtained. According to a role of each page, each page can be classified as an operation process-based page or functional page. The operation process-based page is a page on which concrete processes of the operation flow are shown. For example, a "dial-pad" page corresponding to a "Dial-pad" child node in FIG. 2 can be considered as an operation process-based page, which is a process of the operation flow where the user makes a phone call. By operating this page, the user can complete a phone call operation. The functional page implements a function for users and ultimately provides a service. For example, the "message details" page in FIG. 2 can be considered as a functional page. The role thereof shows the contents of the message selected by the user to the user:

Block S242: When the page is the operation process-based page and the average operation period of the user corresponding to the page is more than a preset first threshold value, it is confirmed that the page has a defect, and a page defect prompt message is generated. When the page is an operation process-based page and the average operation period of the user corresponding to the page is more than a preset first threshold value, it means that most users remain at the current page for an extended amount of time. The server may then conclude that there is a problem in the current page and the operation processes corresponding to the page cause confusion for the user, thus, it is difficult to proceed to the next step and it is confirmed that there is defect in this page. The server 102 then generates a page defect prompt message and shows the page defect prompt message to the program designer via the second terminal 103. The prompt message may include identification of the page including defect, the type of the page, the average operation period of the user corresponding to the page, and so on.

Block S243: When the page is a functional page and the average operation period of the user corresponding to the page is less than a preset second threshold value, it is confirmed that the page has a defect and a page defect prompt message is generated. When the page is a functional page and the average operation period of the user corresponding to the page is less than a preset second threshold value, it means that most users remain at the current page for some time and the server may conclude that the function of the page is not desirable to the users. Thus, it can be confirmed that there is defect in the page and the concrete function of this page needs to be optimized. The server 102 then generates a page defect prompt message and shows the page defect message to the program designer via the second terminal 103. The page defect prompt message may include a page identification of the defect page, the type of the page, the average operation period of the user corresponding to the page, and so on.

Block S25: The sequential relationship among the pages is obtained and a statistics tree corresponding to the sequential relationship among the pages is generated according to the obtained sequential relationship, the total number of user operations on each page within a preset statistical period, the time when the user enters the page, and the time when the user departs the page. The statistics tree includes a node corresponding to each page and an operation probability value corresponding to each node. The detailed method in this step may be apparent by reference to the contents in the first example provided herein, thus the detailed contents will not be described moreover. Further, in addition to the operation probability value, the server 102 may write the average operation period of the user on each page during a preset statistical period, obtained in block S23, into corresponding nodes of the statistics tree.

Block S26: The statistics tree is shown to the program designer. The server 102 shows the statistics tree to the program designer through the second terminal 103, so that the program designer can make an evaluation for the designated program based on the statistics tree, and further optimizes the designated program.

Block S27: The statistical results of the page operation data of at least one history version of the designated program are obtained. The server 102 obtains the statistical results of the page operation data of at least one history version of the designated program from a local or cloud database. The statistical results may include the total number of the user operations on each page of at least one history version of the designated program during a preset statistical period and the corresponding page jump mode.

Block S28: If a difference in value between the total number of the user operations on each page of at least one history version of the designated program during a preset statistical period and the total number of the user operations on each page of the designated program during a preset statistical period that is obtained by statistics this time is more than a preset value, the page identifier of the page of which the deference value more than the preset value is obtained. If each of at least one difference value between the at least one total number of the user operations on a page of at least one history version of the designated program during a preset statistical period and the total number of the user operations on this page of the designated program during a preset statistical period that is obtained by the current statistics is more than a preset value, the page identifier of this page is obtained. For example, if the difference value between the total number of the user operations on a page of each of the plurality of history versions of the designated program during a preset statistical period and the total number of the user operations on these pages of the designated program during a preset statistical period that is obtained by the current statistics is more than a preset value, the page identifier of the page is obtained.

The value differences between the total number of the user operations on each page of at least one history version of the designated program during a preset statistical period and the total number of the user operations on the page of the designated program during a preset statistical period that are obtained by the current statistics are respectively compared with the preset value. If each of the value differences between the total numbers of the user operations on the page of multiple history versions of the designated program during a preset statistical period and the total number of the user operations on the page of the designated program during a preset statistical period that are obtained by the current statistics is more than the preset value, it is determined that the jump mode of this page should be adjusted, and the server 102 obtains the page identifier of the page of which the deference value is larger than the preset value. For example, assume that page A of the obtained V1 version of the designated program has the total numbers of user operations 1,000, 2,000, 1,500, respectively, in three statistical periods (one month) and the page jump mode of page A of this version is the Push Jump mode, the version of the designated program for the current statistics is version V2, the page jump mode for page A of the designated program of version V2 is the Present jump mode, and the total number of the user operations during the statistical period is 100, and the preset value is 800. The difference value between each of the total numbers of the user operations on page A in version V1 of the designated program during the preset statistical periods and the total number of the user operations in the version V2 is larger than 800, thus, it can be determined that page A needs to be adjusted.

According to various embodiments, the statistical result of the page operation data of the current version of the designated program is compared respectively with the statistical results of the page operation data of the multiple history versions of the designated program. According to the compared results, it is determined whether the page jump mode of this page is adjusted. For example, according to the obtained statistical results of the page operation data of the multiple history versions of the designated program, assume that the page jump mode of page A of the version V1 of the designated program is the Push Jump mode and page A has the total number of user operations 1,000 in a preset statistical period, or has an operation probability of 6.7%, the page jump mode of page A of the version V2 of the designated program is the Present Jump mode and page A has the total number of user operations 100 in a preset statistical period, or has an operation probability of 0.7%; the page jump mode of page A of the version V3 of the designated program is the push Jump mode and page A has the total number of user operations 1,500 in a preset statistical period, or has an operation probability of 8%; the current statistic is for version V4 of the designated program, and the page jump mode of page A is the Present Jump mode and page A has the total number of user operations 150 in a preset statistical period, or has an operation probability of 0.8%. It can be seen from the above that the total number (or the operation probability) of the user operations when page A has the Present Jump mode is far less than the operation probability of the user operations when page A has the push Jump mode, thus, it can be determined that page A with the Present Jump mode needs to be adjusted.

Block S29: An adjustment command including the page identifier is sent to the user terminal. The server 102 sends an adjustment command to the user terminal 101 including the page identifier of the page the page jump mode of which needs to be adjusted, so that the user terminal 101 adjusts the page jump mode of the page corresponding to the page identifier according to the adjustment command and a preset adjustment rule.

According to the method for processing page operation data provided according to various embodiments of the present disclosure, the server receives from a user terminal the operation data generated when a user operates each page in the designated program, the identifier of the user and the page identifier of the page that is operated by the user in the designated program, conducts a statistic for the page operation data based on the identifier of the user and the page identifier of each page that is operated by the user, obtains the total number of the user operations on each page in a current statistical period, obtains a sequential relationship among pages, and generates a statistics tree corresponding to the sequential relationship among the pages, wherein the statistics tree includes a node corresponding to each page and the operation probability value corresponding to the node. Since the user operation characteristic parameters voluntarily sent by the user terminal are received quickly and a statistic is conducted for these parameters, a statistical result can be considered as an effective base for optimizing the software, and the issues in the software that appear when the user operates the software can be optimized rapidly and the software usability can be improved. Further, according to operation flows and operation habits of each user during a process of using the software, strengths and weaknesses of the operations and functions of the designated program can be effectively known immediately, thereby implementing targeted software optimizations, and improving speed and effectiveness of the software optimizations.

Figure 6:
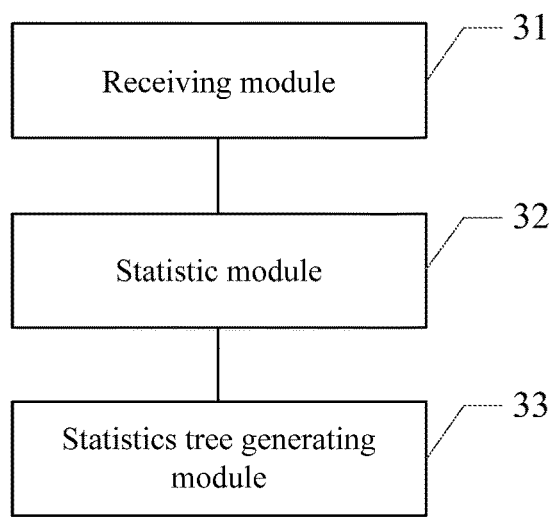
FIG. 6 is a diagram illustrating a structure of an apparatus for processing page operation data according to various embodiments.

FIG. 6 is a diagram illustrating a structure of an apparatus for processing page operation data according to various embodiments of the present disclosure. The apparatus for processing page operation data according to this example implements a method for processing page operation data described in the examples above. As shown in FIG. 6, the apparatus for processing page operation data 30 may include a receiving module 31, a statistic module 32, and a statistics tree generating module 33.

The receiving module 31 receives, from a user terminal, the page operation data produced when a user performs operations on each of pages of a designated program, a user's identifier of the user, and a page identifier of the page operated by the user. The statistic module 32 conducts statistics for the page operation data and obtains a total number of the user operations on the page during a preset statistical period according to the identifier of the user and the identifier of the page that the user operated. The statistics tree generating module 33 generates a statistics tree corresponding to a sequential relationship among the pages according to the sequential relationship among the pages, the total number of user operations on each of the pages within the preset statistical period, and the page operation data, wherein the statistics tree comprises nodes corresponding to each of the pages and node statistics corresponding to each of the nodes.

The details of how each module of the apparatus for processing page operation data 30 to implement their respective functions according to this example can be apparent by reference to the contents described in the examples above shown in FIGS. 1-5, thus, the detailed contents will not be described moreover.

According to the apparatus for processing page operation data according to various embodiments of the present disclosure, a server receives from a user terminal, the page operation data produced when a user performs operations on each of the pages of a designated program, a user's identifier of the user and a page identifier of the page operated by the user, conducts statistics for the page operation data and obtains a total number of the user operations on the page during a preset statistical period according to the identifier of the user and the identifier of the page that the user operated, generates a statistics tree corresponding to a sequential relationship among the pages according to the sequential relationship among the pages, the total number of user operations on each of the pages within the preset statistical period, and the page operation data, wherein the statistics tree comprises nodes corresponding to each of the pages and node statistics corresponding to each of the nodes. Since user operation characteristic parameters voluntarily sent by the user terminal are received quickly and statistics are conducted for these parameters, the statistical result can be considered as an effective base for software optimization, and the issues with the software that appear when the user operates the software can be optimized rapidly and the software usability can be improved. Further, according to operation flows and operation habits of each user during a process of using the software, strengths and weaknesses for operations and functions of the designated program can be effectively known immediately, thereby implementing targeted software optimizations, and improving speed and effectiveness of the software optimizations.

Figure 7:
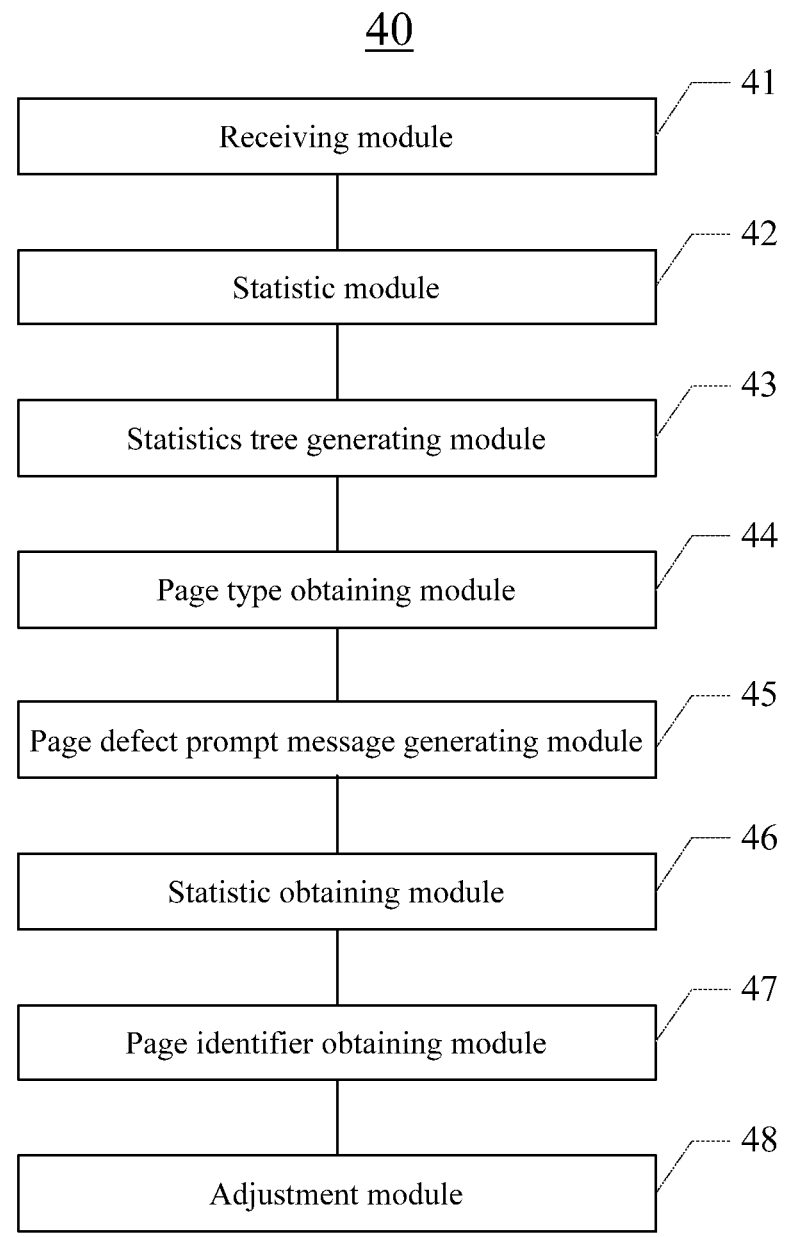
FIG. 7 is a diagram illustrating a structure of an apparatus for processing page operation data according to various embodiments.

FIG. 7 is a diagram illustrating a structure of an apparatus for processing page operation data according to various embodiments of the present disclosure. The apparatus for processing page operation data according to this example implements a method for processing page operation data described in examples above. As shown in FIG. 7, the apparatus for processing page operation data 40 may include a receiving module 41, a statistic module 42 and a statistics tree generating module 43, a page type obtaining module 44, a page defect prompt message generating module 45, a statistic obtaining module 46, a page identifier obtaining module 47, and an adjustment module 48.

The receiving module 41 receives, from a user terminal, the page operation data produced when a user performs operations on each of pages of a designated program, a user's identifier of the user, and a page identifier of the page operated by the user. The statistic module 42 conducts statistics for the page operation data and obtains a total number of the user operations on the page during a preset statistical period according to the identifier of the user and the identifier of the page that the user operated. The statistics tree generating module 43 generates a statistics tree corresponding to a sequential relationship among the pages according to the sequential relationship among the pages, the total number of user operations on each of the pages within the preset statistical period, and the page operation data, wherein the statistics tree comprises nodes corresponding to each of the pages and node statistics corresponding to each of the nodes. The page type obtaining module 44 obtains a type of each of the pages, wherein the type of the page is an operation process-based page type or a functional page type. The page defect prompt message generating module 45 generates a page defect prompt message according to the average operation period of the user corresponding to the page during the preset statistical period and the page type of the page. The statistic obtaining module 46 obtains the total number of the user operations on the page of at least one history version of the designated program during the preset statistical period and the corresponding page jump mode. The page identifier obtaining module 47 obtains the page identifier of the page when a difference value between the total number of the user operations on the page of each of the at least one history version of the designated program during the preset statistical period and the total number of the user operations on the page of the designated program during the preset statistical period that is obtained by conducting the statistics for the page operation data is more than a preset value. The adjustment module 48 sends to the user terminal an adjustment command containing the page identifier of the page, so that the user terminal adjusts the page jump mode of the page corresponding to the page identifier according to the adjustment command and a preset adjustment rule.

According to various embodiments, the node statistics corresponding to each of the nodes of the statistics tree comprise an operation probability value, the operation probability value equates to an operation probability value that the user operates a page corresponding to each child node after the user operates a page corresponding to the parent node of the child node.

According to various embodiments, the statistic module 42 calculates the average operation period of the user on each of the pages within the preset statistical period according to the time when the user enters the page and the time when the user departs the page.

According to various embodiments, the page defect prompt message generating module 45 confirms that the page has a defect and generates the page defect prompt message when the page is the operation process-based page and the average operation period of the user corresponding to the page is more than a preset first threshold value, or confirms that the page has a defect and generates the page defect prompt message when the page is the functional page and the average operation period of the user corresponding to the page is less than a preset second threshold value.

According to various embodiments of the present disclosure, the page operation data further includes a page jump mode of each of the pages.

The details of how each module of the apparatus for processing page operation data 40 implement their respective functions according to this example can be apparent by reference to the contents described in examples above shown in the FIGS. 1-5, thus, the detailed contents will not be described moreover.

According to the apparatus for processing page operation data provided according to various embodiments, a server receives, from a user terminal, the page operation data produced when a user performs operations on each of pages of a designated program, a user's identifier of the user and a page identifier of the page operated by the user, conducts statistics for the page operation data and obtains a total number of the user operations on the page during a preset statistical period according to the identifier of the user and the identifier of the page that the user operated, generates a statistics tree corresponding to a sequential relationship among the pages according to the sequential relationship among the pages, the total number of user operations on each of the pages within the preset statistical period, and the page operation data, wherein the statistics tree comprises nodes corresponding to each of the pages and node statistics corresponding to each of the nodes. Since user operation characteristic parameters voluntarily sent by the user terminal are received quickly and statistics are conducted for these parameters, the statistical result can be considered as an effective base for software optimization, and the issues with the software that appear when the user operates the software can be optimized rapidly and the software usability can be improved. Further, according to operation flows and operation habits of each user during a process of using the software, strengths and weaknesses of the operations and functions of the designated program can be effectively known immediately, thereby implementing targeted software optimizations, and improving speed and effectiveness of the software optimizations.

It should be noted that in the specification of the present disclosure, various embodiments are described progressively, only the differences from other embodiments are described in detail in each embodiment, and the same or similar portions between the embodiments can be understood by reference to the first embodiment. For apparatus embodiments, since the spirit thereof is substantially similar to the method embodiments, these embodiments are only given a relatively simple description, and the details of the portions similar to that in the method embodiments may be apparent by reference to the method embodiments.

It should be noted that, as used herein, relational terms such as first and second and the like are used solely to separate an entity or operation from other entities or operations, and do not necessarily require or imply that these entities or operations have actual relationships or orders there between. Moreover, the terms "comprising", "including" or any other variation thereof means a non-exclusive inclusion, such that the process, method, article, or apparatus which includes a series of factors will include not only those elements, but also other elements which are not explicitly listed, or further includes inherent elements of such process, method, article, or apparatus. Without more constraints, elements defied by the statement "includes a" does not exclude the existence of additional identical elements included in the process, method, article or apparatus which includes the above element.

Those with ordinary skill in the art will understand that all or part of the processes in the above-described embodiments may be accomplished by hardware, or by a program instructing relevant hardware, wherein the program may be stored in a computer readable storage medium and the mentioned storage medium may be a read-only memory, magnetic disk or optical disk.

The forgoing is only the embodiments of the present disclosure, and is not intended to limit the present disclosure in any way. Although the present disclosure has been described in the embodiments, the details are not intended to limit the present disclosure. One with ordinary skill in the art can make changes or modifications to the above embodiments to get equivalent embodiments, without departing from the technical scope of the present disclosure. Any simple changes and equivalent modifications made to the above embodiments based on the technical spirit of the present disclosure still fall into the protection scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more processes within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

What is claimed is:

1. A method for processing page operation data, comprising:
   receiving, by a server, from a user terminal, the page operation data produced when a user performs operations on each of pages of a designated program, a user's identifier of the user and a page identifier of a page operated by the user;
   conducting, by the server, statistics for the page operation data and obtaining a total number of the user operations on the page operated by the user during a preset statistical period according to the identifier of the user and the identifier of the page that the user operated;
   generating, by the server, a statistics tree corresponding to a sequential relationship among the pages according to the sequential relationship among the pages, the total number of user operations on each of the pages within the preset statistical period, and the page operation data, wherein the statistics tree comprises nodes corresponding to each of the pages and node statistics corresponding to each of the nodes;
   wherein the page operation data further comprises a page jump mode of each of the pages, and the method further comprises:
   obtaining the total number of the user operations on each page of at least one history version of the designated program during the preset statistical period and obtaining the corresponding page jump mode;
   obtaining a second page identifier of a page when a difference value between the total number of the user operations on each page of the at least one history version of the designated program during the preset statistical period and the total number of the user operations on each page of the designated program during the preset statistical period that is obtained by conducting the statistics for the page operation data is more than a preset value;
   sending to the user terminal an adjustment command containing the second page identifier, so that the user terminal adjusts the page jump mode of the page corresponding to the second page identifier according to the adjustment command and a preset adjustment rule.

2. The method of claim 1, wherein the node statistics corresponding to each of the nodes of the statistics tree comprises an operation probability value, the operation probability value equals to an operation probability value that the user operates a page corresponding to each child node after the user operates a page corresponding to the parent node of the child node.

3. The method of claim 1, wherein the page operation data comprises a time when the user enters each page and a time when the user departs each page; and the node statistics comprises an average operation period of the user on each of the pages within the preset statistical period;
   the method further comprises:
   calculating the average operation period of the user on each of the pages within the preset statistical period according to the time when the user enters the page and the time when the user departs the page.

4. The method of claim 3, further comprising:
   obtaining a type of each of the pages, wherein the type of the page is an operation process-based page type or a functional page type;
   generating a page defect prompt message according to the average operation period of the user corresponding to the page during the preset statistical period and the page type of the page.

5. The method of claim 4, wherein generating the page defect prompt message according to the average operation period of the user corresponding to the page during the preset statistical period and the page type of the page comprises:
   confirming that the page has a defect and generating the page defect prompt message when the page is the operation process-based page and the average operation period of the user corresponding to the page is more than a preset first threshold value.

6. The method of claim 4, wherein generating the page defect prompt message according to the average operation period of the user corresponding to the page during the preset statistical period and the page type of the page comprises:
   confirming that the page has a defect and generating the page defect prompt message when the page is the functional page and the average operation period of the user corresponding to the page is less than a preset second threshold value.

7. An apparatus for processing page operation data, comprising a memory and a processor communicating with the memory, wherein the memory stores instructions that when executed by the processor configure the processor to:
   receive from a user terminal, the page operation data produced when a user performs operations on each of pages of a designated program, a user's identifier of the user and a page identifier of a page operated by the user;
   conduct statistics for the page operation data, obtain a total number of the user operations on the page operated by the user during a preset statistical period according to the identifier of the user and the identifier of the page that the user operated;
   generate a statistics tree corresponding to a sequential relationship among the pages according to the sequential relationship among the pages, the total number of user operations on each of the pages within the preset statistical period, and the page operation data, wherein the statistics tree comprises nodes corresponding to each of the pages and node statistics corresponding to each of the nodes;

wherein the page operation data further comprises a page jump mode of each of the pages, and the processor is further configured to:

obtain the total number of the user operations on each page of at least one history version of the designated program during the preset statistical period and obtain the corresponding page jump mode;

obtain a second page identifier of a page when a difference value between the total number of the user operations on each page of the at least one history version of the designated program during the preset statistical period and the total number of the user operations on each page of the designated program during the preset statistical period that is obtained by conducting the statistics for the page operation data is more than a preset value;

send to the user terminal an adjustment command containing the second page identifier, so that the user terminal adjusts the page jump mode of the page corresponding to the second page identifier according to the adjustment command and a preset adjustment rule.

8. The apparatus of claim 7, wherein the node statistics corresponding to each of the nodes of the statistics tree comprises an operation probability value, the operation probability value equals to an operation probability value that the user operates a page corresponding to each child node after the user operates a page corresponding to the parent node of the child node.

9. The apparatus of claim 8, wherein the page operation data comprises a time when the user enters each page and a time when the user departs each page; and the node statistics comprises an average operation period of the user on each of the pages within the preset statistical period;

the processor is further configured to calculate the average operation period of the user on each of the pages within the preset statistical period according to the time when the user enters the page and the time when the user departs the page.

10. The apparatus of claim 9, wherein the processor is further configured to:

obtain type of each of the pages, wherein the type of the page is an operation process-based page type or a functional page type;

generate a page defect prompt message according to the average operation period of the user corresponding to the page during the preset statistical period and the page type of the page.

11. The apparatus of claim 10, wherein the processor is further configured to confirm that the page has a defect and generate the page defect prompt message when the page is the operation process-based page and the average operation period of the user corresponding to the page is more than a preset first threshold value.

12. The apparatus of claim 10, wherein the processor is further configured to confirm that the page has a defect and generate the page defect prompt message when the page is the functional page and the average operation period of the user corresponding to the page is less than a preset second threshold value.

* * * * *